(12) United States Patent
Sumi et al.

(10) Patent No.: US 7,654,169 B2
(45) Date of Patent: Feb. 2, 2010

(54) SHIFT LEVER

(75) Inventors: Tomohisa Sumi, Aichi-ken (JP);
Kenichi Kato, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 181 days.

(21) Appl. No.: 11/780,927

(22) Filed: Jul. 20, 2007

(65) Prior Publication Data

US 2008/0022802 A1    Jan. 31, 2008

(30) Foreign Application Priority Data

Jul. 31, 2006   (JP)   .............................. 2006-208218

(51) Int. Cl.
*F16H 59/04*   (2006.01)
(52) U.S. Cl. ..................................... 74/473.3; 74/473.1
(58) Field of Classification Search .............. 74/473.25, 74/473.3, 473.1
See application file for complete search history.

(56) References Cited

U.S. PATENT DOCUMENTS

| 6,601,469 | B1 * | 8/2003 | Giefer et al. ................... 74/537 |
| 7,360,469 | B2 * | 4/2008 | Tomida ........................ 74/537 |
| 2006/0053929 | A1 * | 3/2006 | Tomida .................... 74/473.12 |

FOREIGN PATENT DOCUMENTS

JP        2006-51862 A     2/2006

* cited by examiner

*Primary Examiner*—David M. Fenstermacher
*Assistant Examiner*—Terence Boes
(74) *Attorney, Agent, or Firm*—Roberts Mlotkowski Safran & Cole, P.C.; Thomas W. Cole

(57) ABSTRACT

In a shift lever, when a button of a knob is pressed, a link member is pivoted, and a detent rod is moved down. Further, impact sound or the like is restrained or prevented from being emitted by bringing the link member into contact with a contact member and elastically deforming the contact member. Here, a cover portion of the knob and the contact member are constituted by separate members. Therefore, the cover portion of the knob and the contact member can easily be constituted by materials suitable for respective functions.

12 Claims, 8 Drawing Sheets

SHIFT LEVER

CROSS-REFERENCE TO RELATED APPLICATION

This application claims priority under 35 USC 119 from Japanese Patent Application No. 2006-208218 the disclosure of which is incorporated by reference herein.

BACKGROUND

1. Technical Field

The present invention relates to a shift lever for operating a transmission of a vehicle or the like.

2. Related Art

There is a shift lever in which by operating a button provided at a knob, a link member is pivoted, and a detent rod is moved (refer to, for example, Japanese Patent Application Laid-open (JP-A) No. 2006-51862).

According to the shift lever, when the link member is pivoted, by bringing the link member into contact with a contact portion provided at a cover portion of the knob, the contact portion is elastically deformed, and impact sound is restrained or prevented from being emitted.

Here, according to the shift lever, the cover portion and the contact portion of the knob are integrally molded. Therefore, it is difficult to constitute the cover portion of the knob by a hard material suitable for being grabbed by an occupant (a driver) and constitute the contact portion by a soft material suitable for restraining or preventing impact sound from being emitted.

SUMMARY

In consideration of the fact, the present invention provides a shift lever easily capable of constituting a knob and an elastic member by materials suitable for respective functions thereof.

A shift lever of a first aspect of the present invention includes a knob provided at a tip end portion of a main body of a lever which is made to be pivotable; a moving body which is provided movably in the knob; a moving member provided at the knob, the moving body being moved by the moving member being moved; and an elastic member provided at the knob that is a separate member from the knob, and elastically deforms by being interfered with by the moving member when the moving member is moved.

A shift lever of a second aspect of the present invention according to the first aspect further includes a restricting member attached to the knob, that restricts movement of the elastic member.

According to a shift lever of a third aspect of the present invention according to the second aspect, the restricting member restricts the movement of the elastic member from plural directions.

According to the shift lever of the first aspect of the present invention, the knob is provided at the tip end portion (top end portion) of the lever main body made to be pivotable and the moving body is movably provided in the knob. Further, the moving body is moved by moving of the moving member provided at the knob. Further, the elastic member is provided at the knob, when the moving member is moved, the moving member interferes with the elastic member, and the elastic member is elastically deformed. Thereby, impact sound is restrained or prevented from being emitted.

Here, the knob and the elastic member are constituted by separate members. Therefore, the knob and the elastic member can be constituted by materials suitable for respective functions.

According to the shift lever of the second aspect of the present invention, the restricting member attached to the knob restricts the movement of the elastic member. Therefore, even when the elastic member receives a load from the moving member, the elastic member can be fixed to the knob.

According to the shift lever of the third aspect of the present invention, the restricting member restricts the movement of the elastic member from the plural directions. Therefore, even when the elastic member receives a load from the moving member, the elastic member can firmly be fixed to the knob.

In the aspects of the present invention, it is possible that the knob is provided with a covering portion, and the covering portion and the elastic member are separate members.

Further, in the aspects of the present invention, it is possible that the restricting member is provided inside the covering portion.

Further, in the aspects of the present invention, it is possible that the restricting member includes a first contact portion and a second contact portion, movement of the elastic member in an upper direction being restricted by the first contact portion being contacted with the elastic member and movement of the elastic member in a horizontal direction being restricted by the second contact portion being contacted with the elastic member.

Further, in the aspects of the present invention, it is possible that the elastic member is provided with a latching portion, and the latching portion is latched with a latched portion formed at the covering portion.

Further, in the aspects of the present invention, it is possible that the first contact portion and the second contact portion are a horizontal face and a side face of a notch portion of the restricting member respectively, the notch portion being formed at the restricting member at a lower side and having a substantially rectangular shape.

Further, in the aspects of the present invention, it is possible that the elastic member includes an upper portion and a side portion, the upper portion being interfered with the moving member when the moving member is moved, and the first contact portion and the second contact portion being contacted with the side portion.

Further, in the aspects of the present invention, it is possible that the elastic member is attached to the covering portion by the side portion being engaged with an engaging portion formed at the covering portion at a lower side.

BRIEF DESCRIPTION OF THE DRAWINGS

Exemplary embodiments of the present invention will be described in detail with reference to the following figures, wherein:

FIG. 8A is a side view, and FIG. 8B is a front view.

DETAILED DESCRIPTION

Constitution of Embodiment

Figure 1:
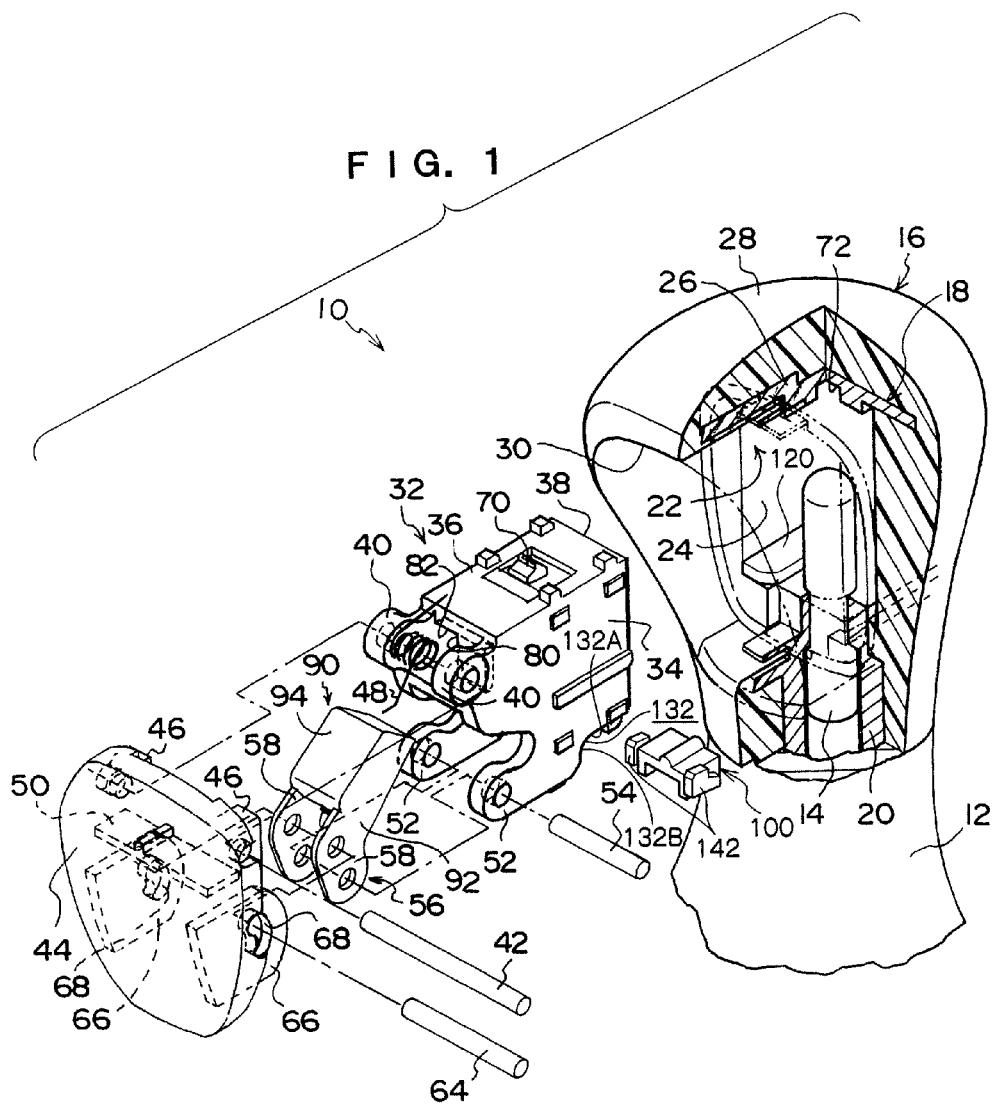
FIG. 1 is a disassembled perspective view of a vicinity of a knob of a shift lever according to an embodiment of the present invention.
Figure 2:
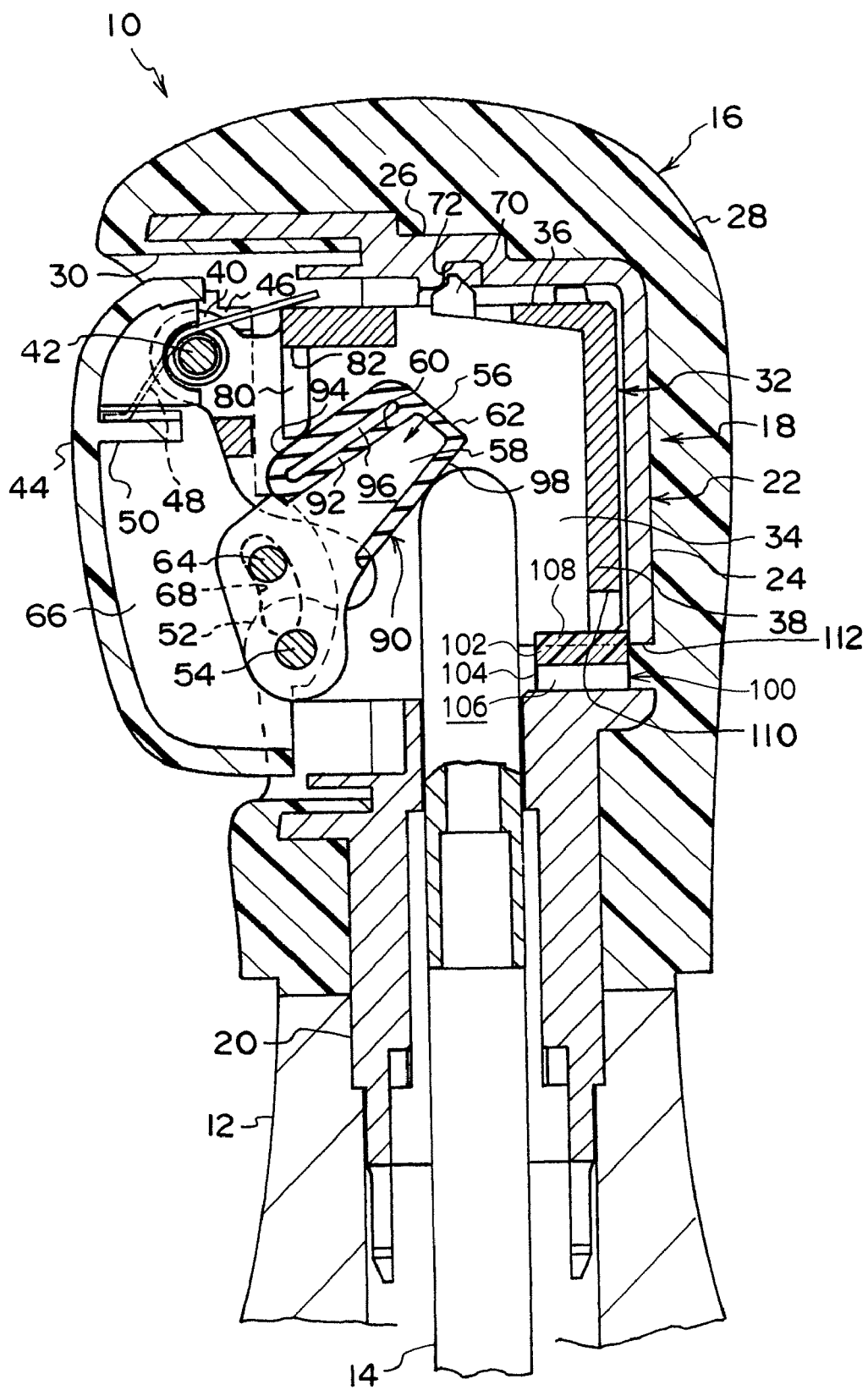
FIG. 2 is a sectional view of the vicinity of the knob of the shift lever according to the embodiment of the present invention.

FIG. 1 shows a structure of an essential portion of a shift lever 10 according to an embodiment of the present invention by a perspective view and FIG. 2 shows a structure of the essential portion of the shift lever 10 by a sectional view.

As shown by the drawings, the shift lever 10 includes a lever main body 12. The lever main body 12 is formed in a shape of a cylinder an inner portion of which is hollow by a synthetic resin material or a metal material.

Although a detailed illustration will be omitted, a base end side (lower side in FIG. 2) of the lever main body is brought to, for example, an inner side of a housing substantially in a box-like shape attached to a vehicle body, and the lever main body 12 is axially supported pivotably by a shaft both ends of which are supported by side walls of the housing, for example, around an axial direction thereof whose direction is a substantially vehicle left and right direction.

Further, as shown by FIG. 1 and FIG. 2, a detent rod 14 in a rod-like shape serving as a moving body is accommodated at an inner side of the lever main body 12 so as to be movable along a longitudinal direction of the lever main body 12. One end portion (upper end portion in FIG. 2) in a longitudinal direction of the detent rod 14 is projected from an opening end formed at a tip (top) end portion (upper end portion in FIG. 2) of the lever main body 12.

Figure 5:
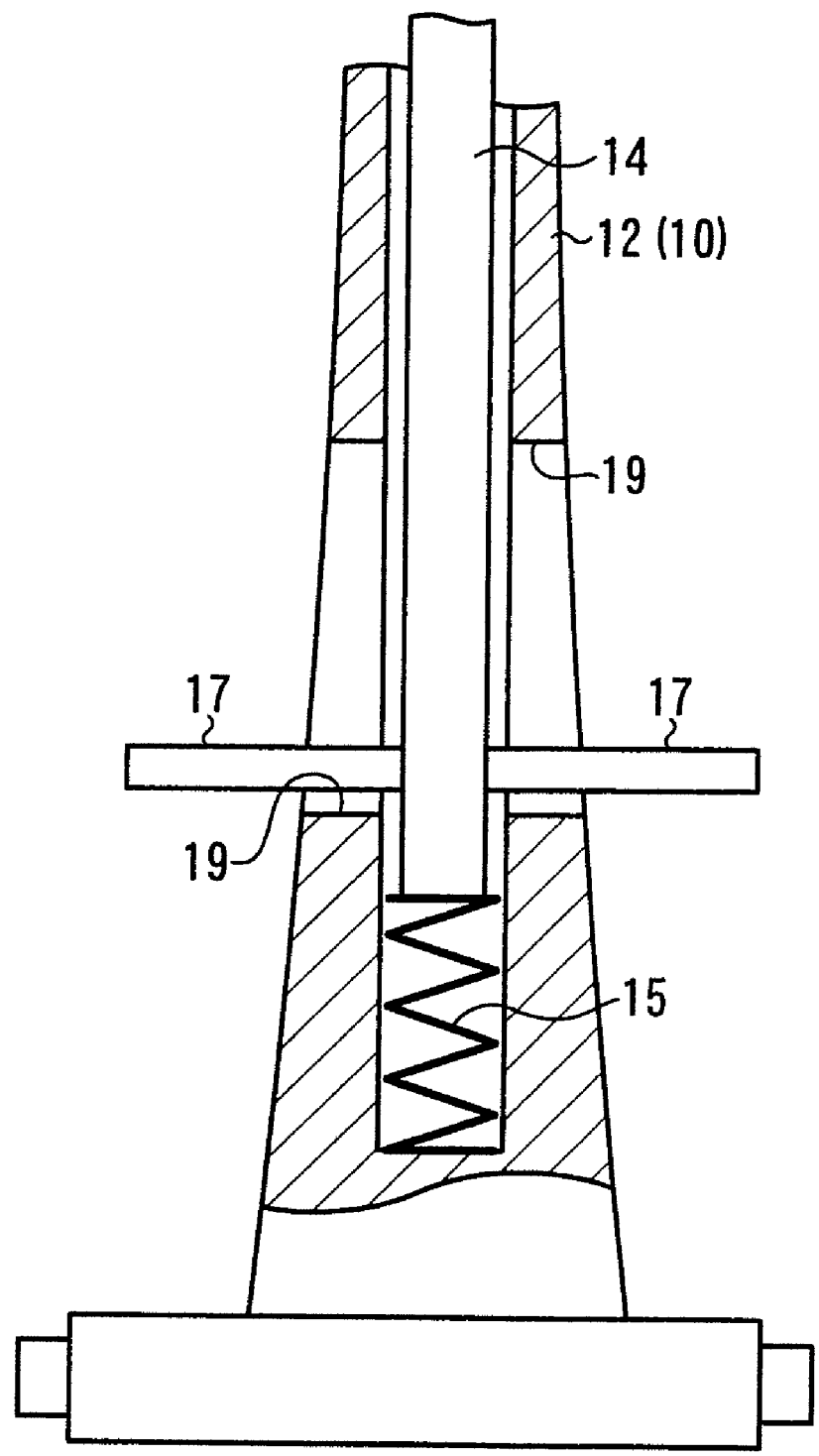
FIG. 5 is a sectional view showing an outline of a constitution of a base end side of a lever main body.
Figure 6:
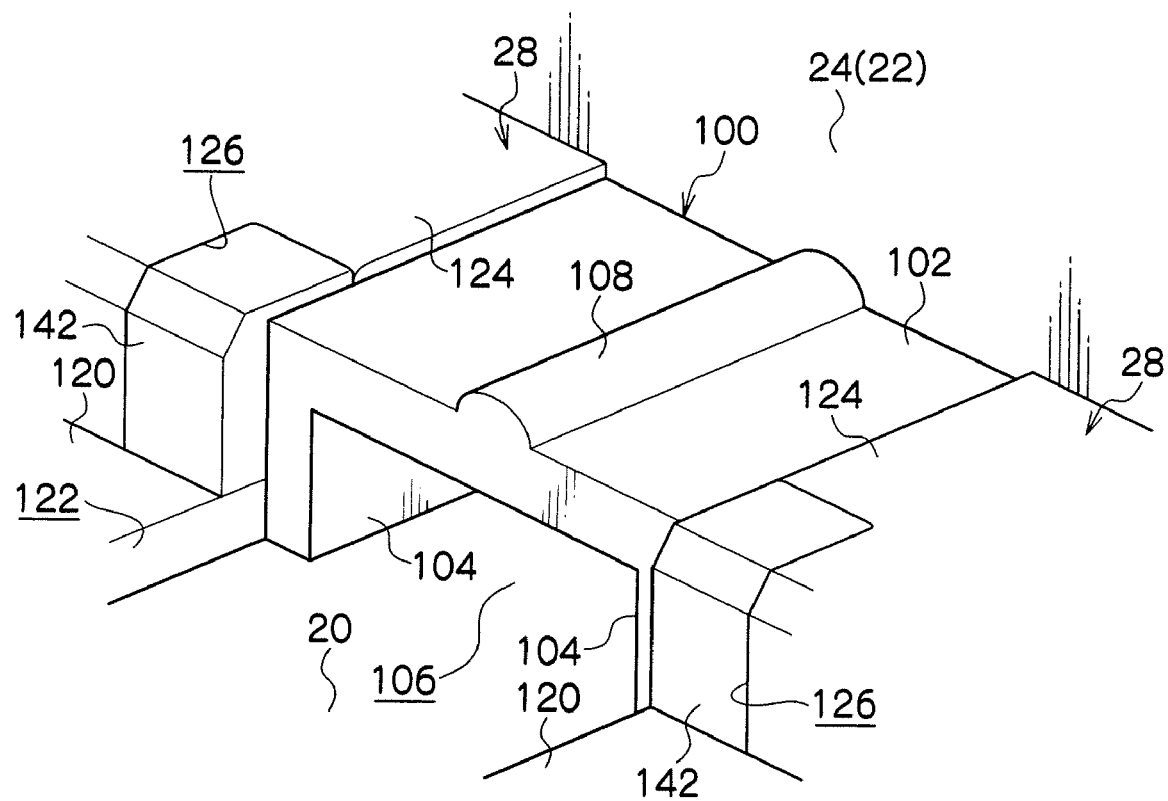
FIG. 6 is a perspective view of an essential portion of a shift lever according to an embodiment of the present invention.
Figure 7:
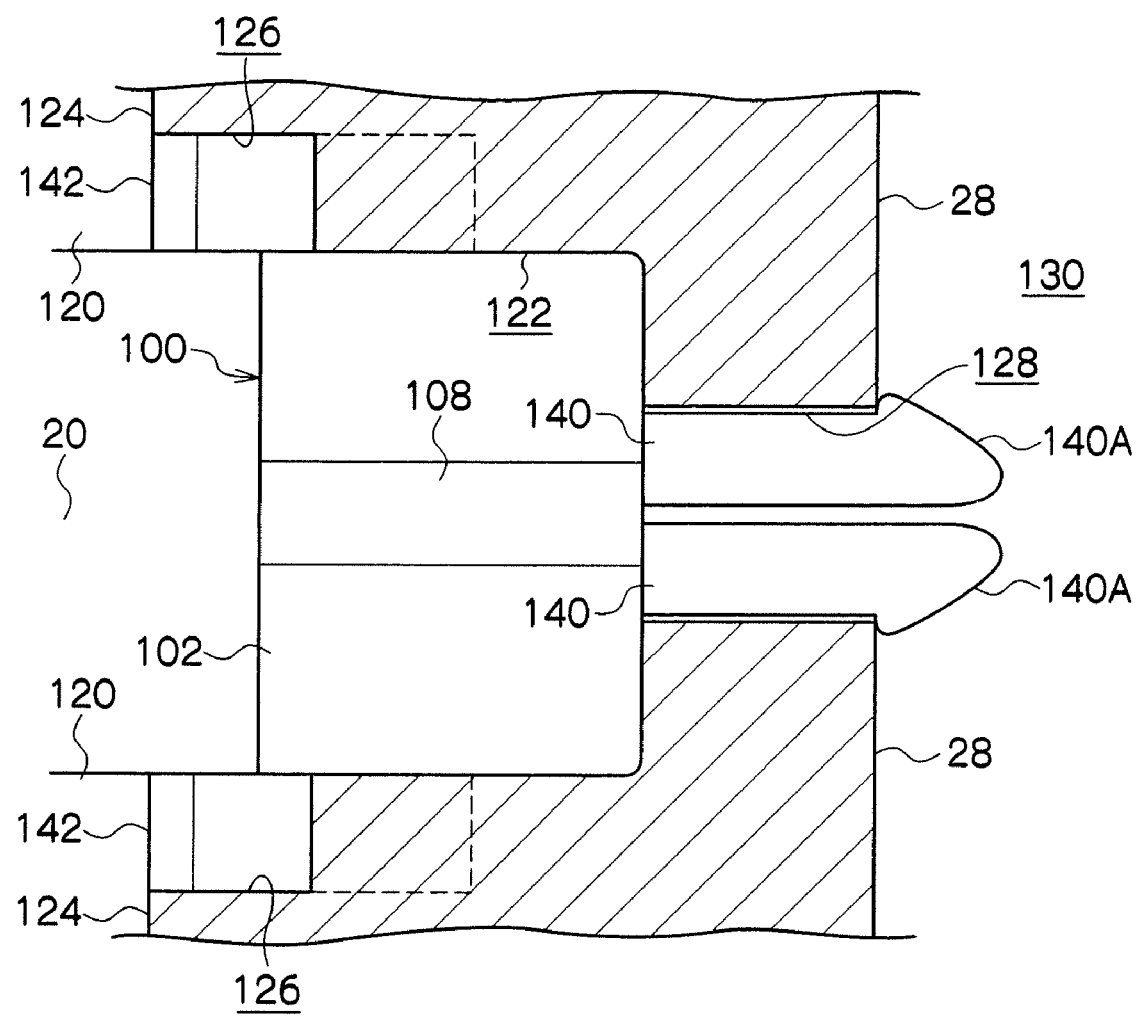
FIG. 7 is a plane view of the essential portion of the shift lever according to the embodiment of the present invention.

As shown by FIG. 5, the base end side of the inner portion of the lever main body 12 is closed. A compression coil spring 15 serving as a second urging member is arranged between an inner bottom portion of the lever main body 12 and the detent rod 14, and the compression coil spring 15 urges the detent rod 14 to a tip end side (that is, upper side in FIG. 5) of the lever main body 12.

Further, a pair of detent pins 17 are projected from an outer peripheral portion on the base end side in the longitudinal direction of the detent rod 14. The outer peripheral portion on the base end side of the lever main body 12 is formed with slit holes 19 for communicating inside and outside of the lever main body 12 in correspondence with the detent pins 17.

Tip end sides of the detent pins 17 are projected to the outer peripheral portion of the lever main body 12 by passing the slit holes 19. The slit hole 19 constitutes a longitudinal shape along the longitudinal direction of the lever main body 12, and the detent pin 17 can be moved in the longitudinal direction of the slit hole 19 in a state of passing the slit hole 19, that is, in the longitudinal direction of the lever main body 12.

Side walls of the housing are formed with detent holes (not illustrated) in correspondence with the tip end sides of the detent pins 17 projected from the slit holes 19, and the tip end sides of the detent pins 17 are brought to inner sides of the detent holes. A projected portion (not illustrated) is formed at a predetermined portion of a face of an inner peripheral face of the detent hole directed to a lower side (further in details, a center side in a pivoting radius direction of the lever main body 12), and when the lever main body 12 reaches a predetermined pivoting position (shift position), the projected portion and the detent pin 17 are opposed (faced) to each other along a pivoting peripheral direction of the lever main body 12.

When the lever main body 12 is intended to pivot in a state of making the projected portion and the detent pin 17 opposed (faced) to each other in this way, the projected portion interferes with the detent pin 17. Thereby, pivoting of the detent pin 17, and therefore, pivoting of the lever main body 12 is restricted.

However, when the detent rod 14 is moved to the base end side of the lever main body 12 against an urge force of the compression coil spring 15, a state of making the detent pin 17 and the projected portion opposed (faced) to each other is released. When the lever main body 12 is pivoted under the state, the detent pin 17 avoids the projected portion to thereby constitute a structure of capable of pivoting the lever main body 12.

On the other hand, as shown by FIG. 1 and FIG. 2, a tip end portion of the lever main body 12 is provided with a knob 16. The knob 16 includes a base 18 constituting a knob main body. The base 18 is formed by a metal or a comparatively hard synthetic resin material. The base 18 includes a cylindrical portion 20. The cylindrical portion 20 is formed by a shape of a cylinder both ends of which are opened.

One end side (lower side of FIG. 2) of a middle portion in a penetrating direction of the cylindrical portion 20 is brought to the inner side of the lever main body 12 from the opening end of the lever main body 12 to be mechanically connected to the lever main body 12, and one end side of the detent rod 14 is brought to an inner side of the cylindrical portion 20.

Further, the base 18 includes a holding portion 22. The holding portion 22 includes a main body 24 opened to one side in a direction orthogonal to a penetrating direction (up and down direction of FIG. 2) of the cylindrical portion 20. The main body 24 is integrally connected to other end (upper end) of the cylindrical portion 20 except a predetermined gap. An upper end portion of the main body 24 is continuously formed with a holding wall 26 and the upper end portion of the main body 24 is closed by the holding wall 26.

A cover portion 28 is provided on an outer side of the base 18 constituted by the cylindrical portion 20 and the holding portion 22. The cover portion 28 is formed in a shape which is easy to be grabbed by a vehicle occupant by a comparatively hard synthetic resin although softer than the base 18. Further, the cover portion 28 is formed with a mounting hole 30, and the mounting hole 30 is opened along a direction of an opening of the main body 24.

As shown in FIG. 6 through FIGS. 8A and 8B in details, at the cover portion 28, a pair of mounting bases 120 in a shape of a rectangular pillar constituting mounting portions are integrally formed, the pair of mounting bases 120 are respectively projected from a portion on a side opposed to the mounting hole 30 of the cover portion 28 onto the cylindrical portion 20 on an inner side of the holding portion 22, and are opposed (faced) to each other in a state of being separated from each other in a direction orthogonal to the penetrating direction of the cylindrical portion 20 and the direction of the opening of the main body 24. A fitting groove 122 having a section in a rectangular shape is constituted between the pair of mounting bases 120, the fitting groove 122 is opened in the direction of the opening of the main body 24 and an end thereof on a side opposed to the direction of the opening of the main body 24 is closed by the cover portion 28.

At the cover portion 28, a pair of fitting bases 124 substantially in a shape of a rectangular pillar constituting fitting portions are integrally formed, the pair of fitting bases 124 are respectively projected from a portion on a side opposed to the mounting hole 30 of the cover portion 28 onto the mounting bases 120 on the inner side of the holding portion 22 so as to be integral with the mounting bases 120, and opposed (faced) to each other in a state of being separated from each other in the direction of making the pair of mounting bases 120 opposed (faced) to each other. An end of the fitting base 124 in the direction of the opening of the main body 24 is arranged on a side opposed to the direction of the opening of the main body 24 in comparison with an end in the direction of the opening main body 24 of the mounting base 120 and the fitting groove 122 is constituted between the pair of fitting bases 124.

In each fitting base 124, a fitting hole 126 is formed constituting an inserted portion, and the fitting hole 126 is opened to a side of the fitting groove 122. A portion on a side of the direction of the opening of the main body 24 of the fitting hole 126 is constituted by a shape of a rectangular pillar and is opened to an upper side and a side of the direction of the opening of the main body 24, and a portion thereof on a side opposed to the direction of the opening of the main body 24 is constituted by a shape of a horizontal trapezoidal pillar and a width in the up and down direction is gradually reduced as proceeding to the side opposed to the direction of the opening of the main body 24.

The cover portion 28 is formed with a latching hole 128 in a shape of a rectangular pillar constituting a latched portion, a side of the latching hole 128 in the direction of the opening of the main body 24 is communicated with the fitting groove 122 between the pair of fitting bases 124, and a side of the latching hole 128 opposed to the direction of the opening of the main body 24 is communicated with a space 130 formed at the cover portion 28.

As shown by FIG. 1 and FIG. 2, a holder 32 constituting a restricting member is inserted to be fitted from the mounting hole 30 of the cover portion 28. The holder 32 includes a pair of side walls 34. The pair of side walls 34 are provided to be opposed (faced) to each other in a direction orthogonal to both directions of the penetrating direction of the cylindrical portion 20 and the direction of the opening of the main body 24. A press notch 132 in a rectangular shape constituting a contact portion is formed at a corner portion on a lower side and a side opposed to the direction of the opening of the main body 24 of each of the side walls 34, and the press notch 132 includes a first contact face 132A and a second contact face 132B respectively constituting contact faces on the upper side and the side in the direction of the opening of the main body 24. The first contact face 132A is mounted on the fitting base 124 and the second contact face 132B presses a side face in the direction of the opening of the main body 24 of the fitting base 124 (refer to FIGS. 8A and 8B).

Further, the holder 32 includes an upper wall 36 and a vertical wall 38. The upper wall 36 is provided along upper end portions of the pair of side walls 34, and the vertical wall 38 is provided along an end portion on one side (a side opposed the direction of the opening of the main body 24) along a width direction of the pair of side walls 34, and the pair of side walls 34 are integrally connected by the upper wall 36 and the vertical wall 38 in a state of maintaining a constant interval therebetween. The cover portion 28 is brought to the holder 32 by passing a communicating portion 110 formed substantially at a center in a width direction of a lower end portion of the vertical wall 38 and a communicating portion 112 formed substantially at a center in a width direction of a lower end portion of a portion of the main body 24 opposed (faced) to the vertical wall 38 along a direction of the opening of the mounting hole 30.

Further, support pieces 40 are provided at vicinities of upper end portions of the pair of side walls 34 and vicinities of the mounting hole 30. A shaft 42 is provided at the support pieces 40. One end side in a longitudinal direction of the shaft 42 penetrates the support piece 40 on one side and is projected to a side opposed to the support piece 40 on other side by way of the support piece 40 on one side, and other end side in the longitudinal direction of the shaft 42 penetrates the support piece 40 on other side and is projected to a side opposed to the support piece 40 on one side by way of the support piece 40 on other side.

The shaft 42 is attached with a button 44 as an operating member. A vicinity of an upper end portion of the button 44 is formed with a pair of attaching pieces 46. The pair of attaching pieces 46 are opposed (faced) to each other along an axial direction of the shaft 42 and end portions of the shaft 42 is respectively brought to the pair of attaching pieces 46 on outer sides of the pair of support pieces 40.

Thereby, the button 44 is supported by the shaft 42 pivotably around the shaft 42. Further, the shaft 42 is provided with a torsion coil spring 48 constituting a first urging member. One end of the torsion coil spring 48 is extended to an upper face side of the upper wall 36 and other end thereof is brought into press contact with a latching piece 50 formed at the button 44 by its own urge force. As described above, according to the button 44, the torsion coil spring 48 is brought into press contact with the latching piece 50 of the button 44 in a state of being pivotable around the shaft 42, and therefore, the button 44 is urged to an inner side in the direction of the opening of the mounting hole 30 around the shaft 42 by the torsion coil spring 48. Therefore, unless a force opposed to the urge force of the torsion coil spring 48 is operated, a portion of the button 44 is brought to the inner side of the mounting hole 30.

Figure 8A:
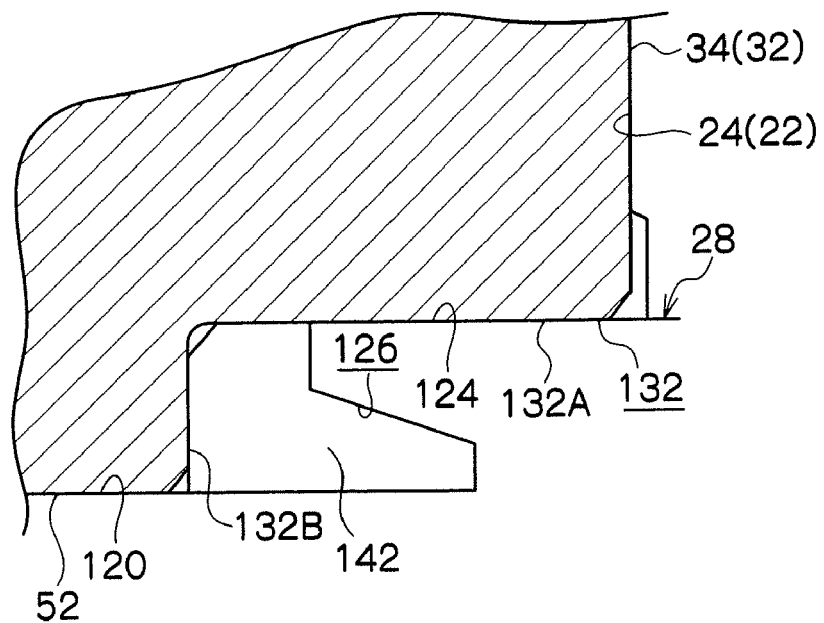
FIGS. 8A and 8B are views of an essential portion of a shift lever according to an embodiment of the present invention.
Figure 8B:
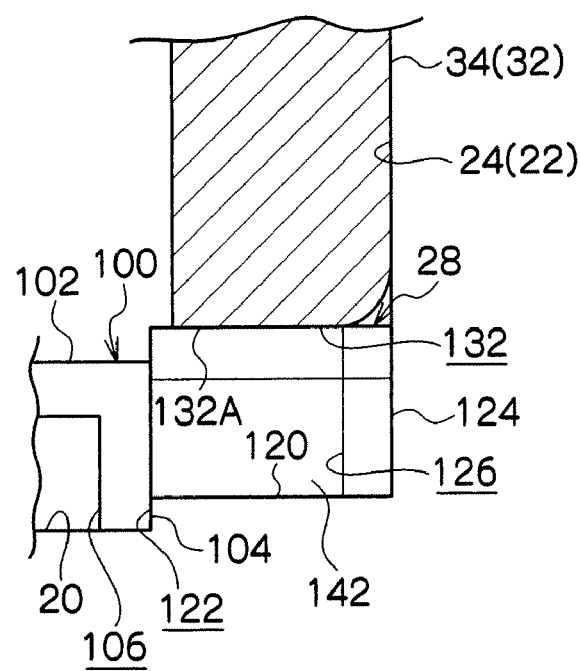

On the other hand, support pieces 52 are provided at vicinities of lower end portions of the pair of side walls 34 and a vicinity of the mounting hole 30 and the support piece 52 are mounted above the mounting base 120 (refer to FIG. 8A). One end portion of a shaft 54 is supported by one of the support pieces 52, and other end portion of the shaft 54 is supported by other of the support pieces 52. The shaft 54 is provided in parallel with the shaft 42. A link member 56 constituting a moving member arranged between the pair of side walls 34 is pivotably (movably) supported by the shaft 54.

The link member 56 includes a pair of side walls 58. The side walls 58 are opposed (faced) to each other along a direction of making the pair of side walls 34 opposed (faced) to each other. A shape of an end face of the side walls 58 is bent substantially "V" shape and the shaft 54 is penetrated at one end sides of the bent portions.

Further, a connecting wall 60 is provided at one end portion in a width direction of other end side of the bent portion of the side wall 58, and the pair of side walls 58 are integrally connected to each other in a state of maintaining a predetermined interval therebetween by the connecting wall 60. Further, other end side of the bent portion of the side wall 58 is covered by a main body portion 92 constituting an elastic member main body constituting a cover portion 90 constituting an elastic member.

The main body portion 92 is formed in a shape of a bottomed cylinder having a section in a rectangular shape by, for example, a rubber material or a synthetic resin material having an elasticity to a degree of that of the rubber member, and the main body portion 92 is mounted to the link member 56 in a state of bringing the two side walls 58 and the connecting wall 60 from a side of an opening end thereof.

Further, the cover portion 90 includes a contact portion 94. The contact portion 94 is formed in a shape of a plate in parallel with the connecting wall 60 by a material the same as that of the main body portion 92. The contact portion 94 is provided to be separated from the main body portion 92 in a thickness direction of the connecting wall 60, further, the contact portion 94 is integrally coupled to the main body portion 92 at an outer peripheral portion thereof.

Substantially, the main body portion 92 and the contact portion 94 are integrally molded and an interval between the contact portion 94 and the main body portion 92 is made to constitute a hollow cavity portion 96 constituting a gap portion.

On the other hand, a wall portion on a side opposed to the contact portion 94 of the main body portion 92 is made to constitute a pressing portion 98. The pressing portion 98 is brought into contact with the tip end (upper end) of the detent rod 14 when the side wall 58 (that is, the link member 58) is pivoted in one direction around the shaft 54, and the pressing portion 98 presses down the detent rod 14 to the base end side of the lever main body 12 against the urge force of the compression coil spring 15.

Further, a contact member 100 (cushion) constituting an elastic member is provided above an upper end of the cylindrical portion 20 in correspondence with a position of pivoting the link member 56 when the detent rod 14 is pressed down to the base end side by a predetermined stroke against the urge force of the compression coil spring 15 by the pressing portion 98. The contact member 100 is formed by, for example, a rubber material or a synthetic resin material having an elasticity to a degree the same as that of the rubber material and is made to be elastically deformable.

As shown in FIG. 6 through FIGS. 8A and 8B in details, the contact member 100 includes an upper wall 102 constituting an elastic member main body. The upper wall 102 is formed by a shape of a flat plate of a thickness direction thereof along a direction of an opening of an upper end opening portion of the cylindrical portion 20 and is brought into contact with a face of the fitting groove 122 on a side opposed to the direction of the opening of the main body 24.

The upper wall 102 is integrally formed with a pair of latching claws 140 substantially in a shape of a rectangular pillar constituting a latching portion, the pair of latching claws 140 are respectively extended from the upper wall 102 to a side opposed to the direction of the opening of the main body 24 and are opposed (faced) to each other in a state of being separated from each other in a direction orthogonal to the penetrating direction of the cylindrical portion 20 and the direction of the opening of the main body 24. Latching projections 140A in a shape of a triangle pillar are projected and formed at tip ends of the latching claws 140, and the contact member 100 is latched by (is assembled to) the cover portion 28 by latching the pair of latching projections 140A at a portion of the cover portion 28 at a periphery of the latching hole 128 in a state of inserting the pair of latching claws 140 through the latching hole 128 of the cover portion 28 and inserting the pair of latching projections 140A to the space 130 of the cover portion 28.

Further, vertical walls 104 are formed at both ends in a width direction of the upper wall 102 along a direction orthogonal to both directions of the direction of the opening of the upper end opening portion of the cylindrical portion 20 and the direction of the opening of the mounting hole 30. The upper wall 102 and the pair of vertical walls 104 are fitted to the fitting groove 122, and the vertical walls 104 are made to be brought into contact with the mounting bases 120 and the fitting bases 124.

End portions of the vertical walls 104 on sides opposed to portions thereof coupled to the upper wall 102 are brought into contact with the upper end of the cylindrical portion 20 and support the upper wall 102 in a state of separating the upper wall 102 from the upper end of the cylindrical portion 20. By supporting the upper wall 102 in the state of separating from the upper end of the cylindrical portion 20 in this way, a gap portion 106 is formed between the upper wall 102 and the upper end of the cylindrical portion 20.

Further, at an end face of the upper wall 102 on a side opposed to the upper end of the cylindrical portion 20, a projected portion 108 is formed to project to a side opposed to the gap portion 106. A dimension of the projected portion 108 along the width direction of the upper wall 102 is sufficiently smaller than that of the upper wall 102 and the projected portion 108 is continuously formed at the upper wall 102 along the direction of the opening of the main body 24.

At the contact member 100, fitting pillars 142 are integrally formed constituting inserting portions on outer sides of the respective vertical walls 104, and the fitting pillars 142 are inserted to the fitting holes 126 of the fitting base 124 from a side of the direction of the opening of the main body 24. A portion on a side of the direction of the opening of the main body 24 of the fitting pillar 142 is constituted by a shape of a rectangle pillar and is fitted to a portion on a side in the direction of the opening of the main body 24 of the fitting hole 126, and a portion on a side opposed to the direction of the opening of the main body 24 of the fitting pillar 142 is constituted by a shape of a horizontal trapezoidal shape and is fitted to the portion on the side opposed to the direction of the opening of the main body 24 of the fitting hole 126. A portion on a side in the direction of the opening of the main body 24 of the fitting pillar 142 is brought into contact with (pressed to) the first contact face 132A of the holder 32 at an upper side face thereof and is brought into contact with (pressed to) of the second contact face 132B of the holder 32 at a side face thereof in the direction of the opening of the main body 24.

As shown by FIG. 1 and FIG. 2, a latching pin 64 in parallel with the shafts 42, 54 is penetrated through the bent portion of the side wall 58 of the link member 56. The button 44 is formed with a pair of guide walls 66 in correspondence with the engaging pin 64. The pair of guide walls 66 are opposed (faced) to each other along the direction of making the side walls 34, 58 opposed (faced) to each other.

The guide walls 66 are formed with guide grooves 68. A dimension of an inner width of the guide groove 68 is extremely slightly larger than a dimension of an outer diameter of the engaging pin 64 and end portions of the engaging pin 64 both ends of which are projected to outer sides of the pair of side walls 58 are brought to inner sides of the guide grooves 68. Thereby, the button 44 and the link member 56 are mechanically connected.

The engaging pin 64 the both ends of which are brought to the guide grooves 68 in this way is movable relative to the button 44 between one end and other end in a longitudinal direction of the guide groove 68. However, relative movement of the engaging pin 64 relative to the button 44 along the width direction of the guide grooves 68 is restricted by being interfered with inner walls of the guide grooves 68.

Therefore, when the button 44 is pivoted around the shaft 42, the inner walls of the guide walls 68 interfere with the latching pin 64 to press the engaging pin 64 and the link member 56 is pivoted around the shaft 54. Further, conversely thereto, when the link member 56 is pivoted around the shaft 54, the engaging pin 64 interferes with the inner walls of the guide grooves 68 to press the inner walls of the guide grooves 68 and the button 44 is pivoted around the shaft 42.

Here, as described above, the button 44 is urged in the direction of being brought to the inner side of the mounting hole 30 by the torsion coil spring 48, and the button 44 operated with the urge force presses the pressing portion 98 to the detent rod 14 around the shaft 54.

However, as described above, the detent rod 14 is urged to the upper side of the lever main body 12 by the urge force of the compression coil spring 15. Therefore, the detent rod 14 is going to press up the pressing portion 98.

That is, according to the embodiment, the urge force of the coil spring 15 is operated to be opposed to the urge force of the torsion coil spring 48. Here, according to the embodiment, a spring constant of the compression coil spring 15 is larger than a spring constant of the coil spring 48.

Therefore, in a state in which an external force in a direction the same as that of the urge force of the torsion coil spring 48, that is, a direction of pressing the button 44 to the inner side of the mounting hole 30 is not exerted to the button 44 separately from the urge force of the torsion coil spring 48, the detent rod 14 urged by the compression coil spring 15 presses up the pressing portion 98 to press the button 44 to the outer side of the mounting hole 30.

Further, the guide grooves 68 are bent by a radius of curvature centering on a predetermined portion on a side of the mounting hole 30 between ends on one side to ends on other side in the longitudinal direction.

The holder 32 attached with the button 44 and the link member 56 is constituted by a structure of being mounted to the knob 16 by being inserted to be fitted to the inner side of the knob 16 from the mounting hole 30 and fitting an elastic fitting piece 70 formed at the upper wall 36 to a fitting hole 72 to thereby prevent the elastic fitting piece 70 from being drawn to the outer side of the mounting hole 30.

Operation, Effect of the Embodiment

Next, operation and effect of the embodiment will be explained.

When the shift lever 10 is pivoted centering on an axially supported portion of the base end side in a state of grabbing the knob 16 to reach a previously set pivoting position (shift position), a position of pivoting the lever main body 12 is detected by a position detecting apparatus of a magnetic sensor of a Hall element or the like or a microswitch or the like provided at the housing. An electric signal in correspondence with a result of detecting the position of pivoting the lever main body 12 by the position detecting apparatus is inputted to ECU for controlling an automatic transmission. A shift range of the automatic transmission is changed in accordance with the inputted electric signal (that is, the result of detecting the position of pivoting the lever main body 12) at ECU.

Further, for example, in a state in which the lever main body 12 reaches a shift position in correspondence with a neutral range of shutting off transmission of a drive force of an engine to a wheel (hereinafter, the shift position (first shift position) is referred to as "N position" for convenience of explanation) a projected portion formed at the detent hole is disposed on a locus of pivoting the detent pin 17 when the lever main body 12 is pivoted to a shift position for moving back the vehicle by transmitting the drive force of the engine to the wheel from the N position (hereinafter, the shift position (second shift position) is referred to as "R position" for convenience of explanation) to be opposed (faced) to the detent pin 17.

When the lever main body 12 is simply going to be pivoted to a side of the R position under the state, the projected portion of the detent hole is brought into contact with the detent pin 17 to restrict pivoting of the detent pin 17. By restricting pivoting of the detent pin 17 in this way, pivoting of the lever main body 12 to the side of the R position is restricted. Thereby, the lever main body 12 can be prevented from being pivoted unpreparedly from the N position to the R position.

Figure 3:
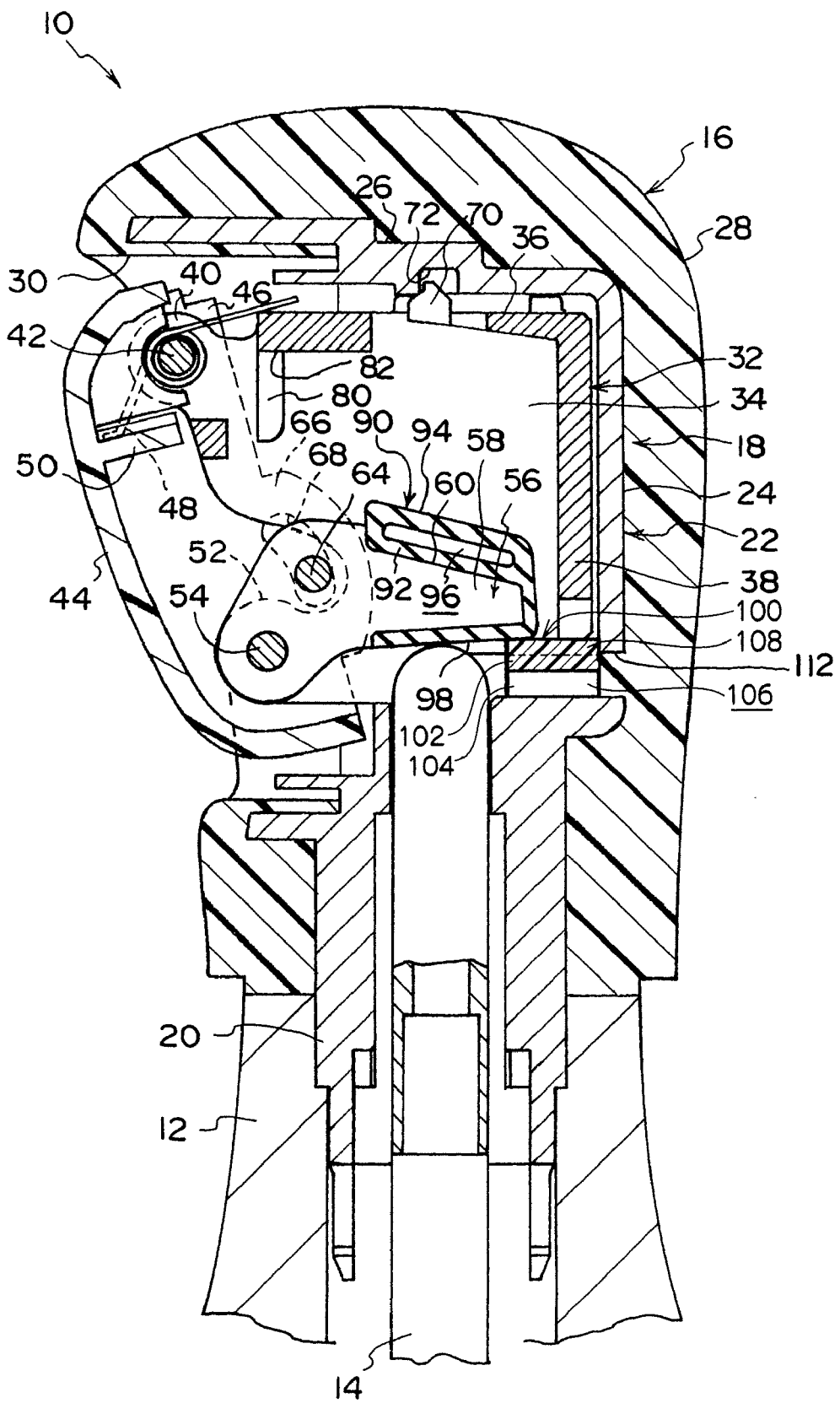
FIG. 3 is a sectional view in correspondence with FIG. 2 showing an initial stage of bringing a link member into contact with a contact member.
Figure 4:
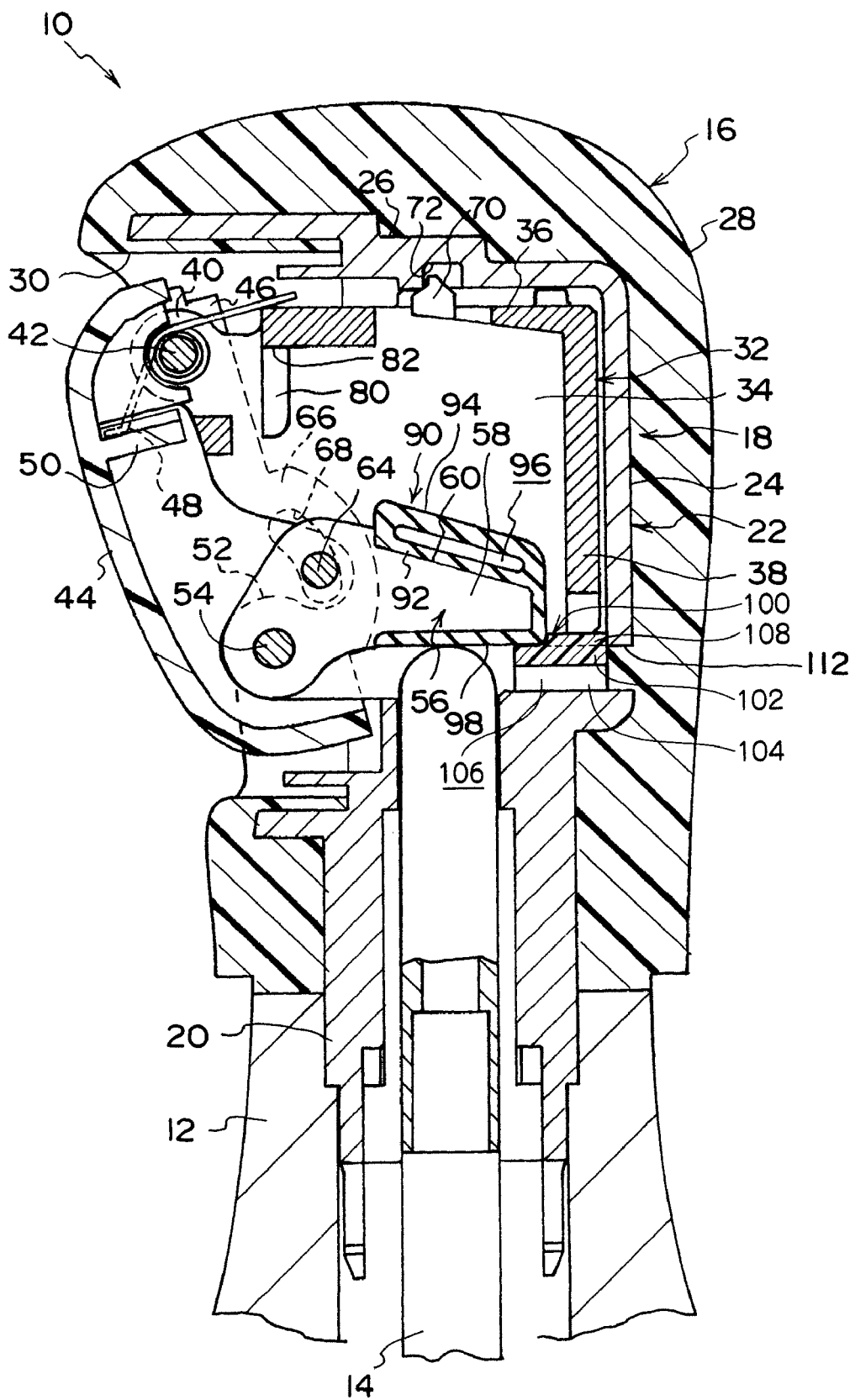
FIG. 4 is a sectional view in correspondence with FIG. 2 showing a final stage of bringing the link member into contact with the contact member.

On the other hand, when the button 44 is pivoted around the shaft 42 by pressing the button 44 provided at the knob 16 as shown by FIG. 3 and FIG. 4 in a state in which the lever main body 12 reaches the N position as described above, a lower end side of the button 44 is moved to an inner side of the knob 16. When the button 44 is pivoted in this way, the inner wall of the guide groove 68 is pivoted along with the button 44 to press the outer peripheral portion of the engaging pin 64 in a pivoting peripheral direction of the button 44.

However, the engaging pin 64 is integrally connected to the two side walls 58 of the link member 56 at a middle portion thereof in the longitudinal direction, further, by supporting the link member 56 connected with the engaging pin 64 by the shaft 54, the movement of the engaging pin 64 is restricted to pivoting around the shaft 54. Therefore, the engaging pin 64 receiving a pressing force from the inner wall of the guide groove 68 is pivoted in one direction around the shaft 54 (right-handed direction of FIG. 2 through FIG. 4) by being accompanied by the link member 56.

When the link member 56 is pivoted in one direction around the shaft 54 in this way, the pressing portion 98 provided at the link member 56 presses the tip end portion of the detent rod 14 against the urge force of the compression coil spring 15 provided at the inner portion of the lever main body 12 to move down (move) the detent rod 14 to the base end side of the lever main body 12.

By moving down the detent rod 14 in this way, the detent pin 17 integral with the detent rod 14 is moved down, thereby, the state of the detent pin 17 and the projected portion of the detent hole being opposed (faced) to each other along the direction of pivoting the detent pin 17 when pivoting the lever main body 12 from the N position to the R position is released.

Therefore, even when the lever main body 12 is pivoted from the N position to the R position under the state, the detent pin 17 is pivoted by avoiding the projected portion of the detent hole. Therefore, the lever main body 12 can be pivoted from the N position to the R position, and the shift range of the automatic transmission can be changed to the reverse range.

However, when the link member 56 is pivoted in one direction around the shaft 54 by pivoting the engaging pin 64 in one direction around the shaft 54 (right-handed direction of FIG. 2 through FIG. 4) by being accompanied by the link member 56, a tip end of the link member 56 on a side of providing the cover portion 90 is made to be proximate to the upper end of the cylindrical portion 20. Further, when the pressing portion 98 moves down the detent rod 14 against the urge force of the compression coil spring 15 until releasing the state of the detent pin 17 and the projected portion of the detent hole being opposed (faced) to each other along the direction of pivoting the detent pin 17 when the lever main body 12 is pivoted from the N position to the R position, substantially, the upper end face of the cylindrical portion 20 and the tip end of the pressing portion 98 are made to be opposed (faced) to each other in the direction of the opening of the upper end opening portion of the cylindrical portion 20.

However, as described above, the upper end face of the cylindrical portion 20 is provided with the contact member 100 in correspondence with the tip end of the pressing portion 98, when the tip end of the link member 56, on a side of being provided with the cover portion 90, is pivoted in a direction toward approaching the upper end face of the cylindrical portion 20, as shown by FIG. 3 and FIG. 4, the pressing portion 98 is brought into contact with the contact member 100.

The upper wall 102 of the contact member 100 is supported by the upper end face of the cylindrical portion 20 by way of the vertical wall 104, and therefore, the pressing portion 98, and therefore, the link member 56 is interfered with the upper end face of the cylindrical portion 20 by way of the contact member 100 and further pivoting of the link member 56 is restricted by the upper end face of the cylindrical portion 20.

Here, according to the embodiment, the cover portion 90 (pressing portion 98) and the contact member 100 are molded by a rubber material or a synthetic resin material having an elasticity to a degree of the rubber material, and therefore, an impact when the pressing portion 98 is brought into contact with the contact member 100 (upper wall 102 and projected portion 108) by pivoting the link member 56 is absorbed by elastically deforming the cover portion 90 and the contact member 100. Thereby, an impact sound or the like caused by the impact when the pressing portion 98 is brought into contact with the contact member 100 can effectively be restrained or prevented.

On the other hand, when the pressing force exerted to the button 44 is released, the detent rod 14 urged by the compression coil spring 15 presses up the pressing portion 98. Thereby, when the link member 56 is pivoted around the shaft 54, the engaging pin 64 presses the inner wall of the guide groove 68 and pivots the button 44 around the shaft 42 against the urge force of the torsion coil spring 48. Thereby, the button 44 is pressed out to the outer side of the mounting hole 30.

Here, when the link member 56 is pivoted as described above, the connecting wall 60 of the link member 56 is made to be proximate to a lower end of the vertical wall 80. When the connecting wall 60 of the link member 58 is made to be proximate to the lower end portion of the vertical wall 80 by a predetermined distance, as shown by FIG. 2, the contact portion 94 constituting the cover portion 90 is brought into contact with the lower end portion of the vertical wall 80.

By bringing the contact portion 94 into contact with the lower end portion of the vertical wall 80 in this way, the connecting wall 60 of the link member 56 interferes with the lower end portion of the vertical wall 80 by way of the main body portion 92, the cavity portion 96, and the contact portion 94. Thereby, further pivoting of the link member 56 by the urge force of the torsion coil spring 48 is restricted, and therefore, pivoting of the button 44 is restricted.

Here, the cover portion 90 is formed by a rubber material or a synthetic resin material having an elasticity to a degree of that of the rubber material. Therefore, the contact portion 94 is elastically deformed by a press reaction force when the contact portion 94 is brought into contact to press the lower end portion of the vertical wall 80. An impact when the contact portion 94 is brought into contact with the lower end portion of the vertical wall 80 is absorbed by elastically deforming the contact portion 94. Thereby, an impact sound caused by such an impact can be alleviated or the impact sound can be prevented from being emitted.

Meanwhile, the cover portion 28 of the knob 16 and the contact member 100 are constituted by separate members. Therefore, the cover portion 28 of the knob 16 and the contact member 100 can easily be constituted by materials suitable for respective functions thereof, whereas the cover portion 28 of the knob 16 can be constituted by a hard material optimum for being grabbed by an occupant, the contact member 100 can be constituted by a soft material optimum for restraining or preventing an impact sound from being emitted.

Further, the portion of the fitting pillar 142 of the contact member 100 on the side in the direction of the opening of the main body 24 is brought into contact with the first contact face 132A of the holder 32 at the upper side face and is brought into contact with the second contact face 132B of the holder 32 at the side face in the direction of the opening of the main body 24, and the movement of the contact member 100 is restricted from the upper side and the side of the opening of the main body 24. Therefore, even when the contact member 100 (particularly, the upper wall 102 and the projected portion 108) receives an overload or receives a repeated load from the pressing portion 98 of the link member 56, by the fitting pillar 142 being pressed from plural directions by the first contact face 132A and the second contact face 132B, latching of the contact member 100 to the cover portion 28 by the latching claws 140 can be prevented from being released, and the contact member 100 can firmly be fixed to the knob 16 (the cover portion 28).

Further, according to the embodiment, as described above, there is a constructed a constitution of pivoting both of the button 44 and the link member 56. However, from a view point of the present invention described in the scope of claims, a mode of moving the button 44 and the link member 56 is not limited to pivoting but may be a linear displacement.

Further, although according to the embodiment, the link member 56 serves as the moving member, from a view point of the present invention described in the scope of claims, the moving member is not limited to the link member 56. That is, for example, when there is constructed a constitution of directly pressing the detent rod 14 by the button 44 without providing the link member 56, further, when there is constructed a constitution in which even when a middle member such as the link member 56 is provided, the button 44 is provided separately from the middle member, and the moved button 44 is brought into contact with the middle member to further move the middle member, the button 44 can also be grasped as the moving member.

Further, although according to the embodiment, there is constructed a constitution of providing the engaging pin 64 at the link member 56 by forming the guide groove 68 at the button 44, there may be constructed a constitution in which the guide groove 68 is formed at the link member 56 and the engaging pin 64 is provided at the button 44.

Further, according to the embodiment, there is constructed a constitution of detecting the position of pivoting the lever main body 12 by the position detecting apparatus of a magnetic sensor of a Hall element or the like or a microswitch or the like. However, the constitution of detecting the position of pivoting the lever main body 12 is not limited to such a position detecting apparatus.

Further, there may be constructed a constitution of providing a connecting member of a wire, a cable or the like for displacing a portion of connecting with the lever main body 12 in accordance with pivoting of the lever main body 12, connecting the lever main body 12 directly or indirectly to an automatic transmission by way of the connecting member, and detecting the position of pivoting the lever main body 12 by the automatic transmission based on a direction of displacing and an amount of displacing the connecting member.

What is claimed is:
1. A shift lever comprising:
   a knob provided at a tip end portion of a main body of a lever which is made to be pivotable;

a detent rod slidably movable within said main body of said lever;

a moving member moveable along a path within the knob and operably linked to said detent rod, the moving member moving the detent rod a predetermined distance within said main body of said lever; and an elastic member provided within the knob that stops the moving member at the end of said path, said elastic member being a separate member from the knob, and formed from an elastic material that is softer than a material forming a covering portion of the knob, and that elastically deforms when struck by the moving member when the moving member completes moving said detent rod said predetermined distance such that an impact noise is prevented or restrained.

2. The shift lever of claim 1, further comprising:

a restricting member attached to the knob, that restricts movement of the elastic member.

3. The shift lever of claim 2, wherein the restricting member restricts the movement of the elastic member from a plurality of directions.

4. The shift lever of claim 3, wherein the restricting member includes a first contact portion and a second contact portion, movement of the elastic member in an upper direction being restricted by the first contact portion being contacted to the elastic member and movement of the elastic member in a horizontal direction being restricted by the second contact portion being contacted to the elastic member.

5. The shift lever of claim 4, wherein the first contact portion and the second contact portion are a horizontal face and a side face of a notch portion of the restricting member respectively, the notch portion being formed at the restricting member at a lower side and having a substantially rectangular shape.

6. The shift lever of claim 4, wherein the elastic member includes an upper portion and a side portion, the upper portion being interfered with the moving member when the moving member is moved, and the first contact portion and the second contact portion being contacted with the side portion.

7. The shift lever of claim 6, wherein the elastic member is attached to the covering portion by the side portion being engaged with an engaging portion formed at the covering portion at a lower side.

8. The shift lever of claim 2, wherein the covering portion and the elastic member are separate members.

9. The shift lever of claim 8, wherein the elastic member is provided with a latching portion, and the latching portion is latched with a latched portion formed at the covering portion.

10. The shift lever of claim 2, wherein the restricting member is provided inside the covering portion.

11. The shift lever of claim 1, wherein the knob is formed from a hard resin material and the elastic member is formed from a relatively softer material.

12. A shift lever comprising:

a knob made of a hard resin material provided at a tip end portion of a main body of a lever which is made to be pivotable;

a detent rod slidably movable within said main body of said lever;

a moving member moveable along a path within the knob and operably linked to said detent rod, the moving member moving the detent rod a predetermined distance within said main body of said lever; and an elastic member provided within the knob that stops the moving member at the end of said path, said elastic member being a separate member from the knob, and formed from an elastic material that is softer than the hard resin material forming the knob, and that elastically deforms when struck by the moving member when the moving member completes moving said detent rod said predetermined distance such that an impact noise is prevented or restrained, said elastic member including at least one latching claw for mounting the elastic member into the knob.

* * * * *